Inventors:
Gustav O. Wilms
Lynn H. Matthias

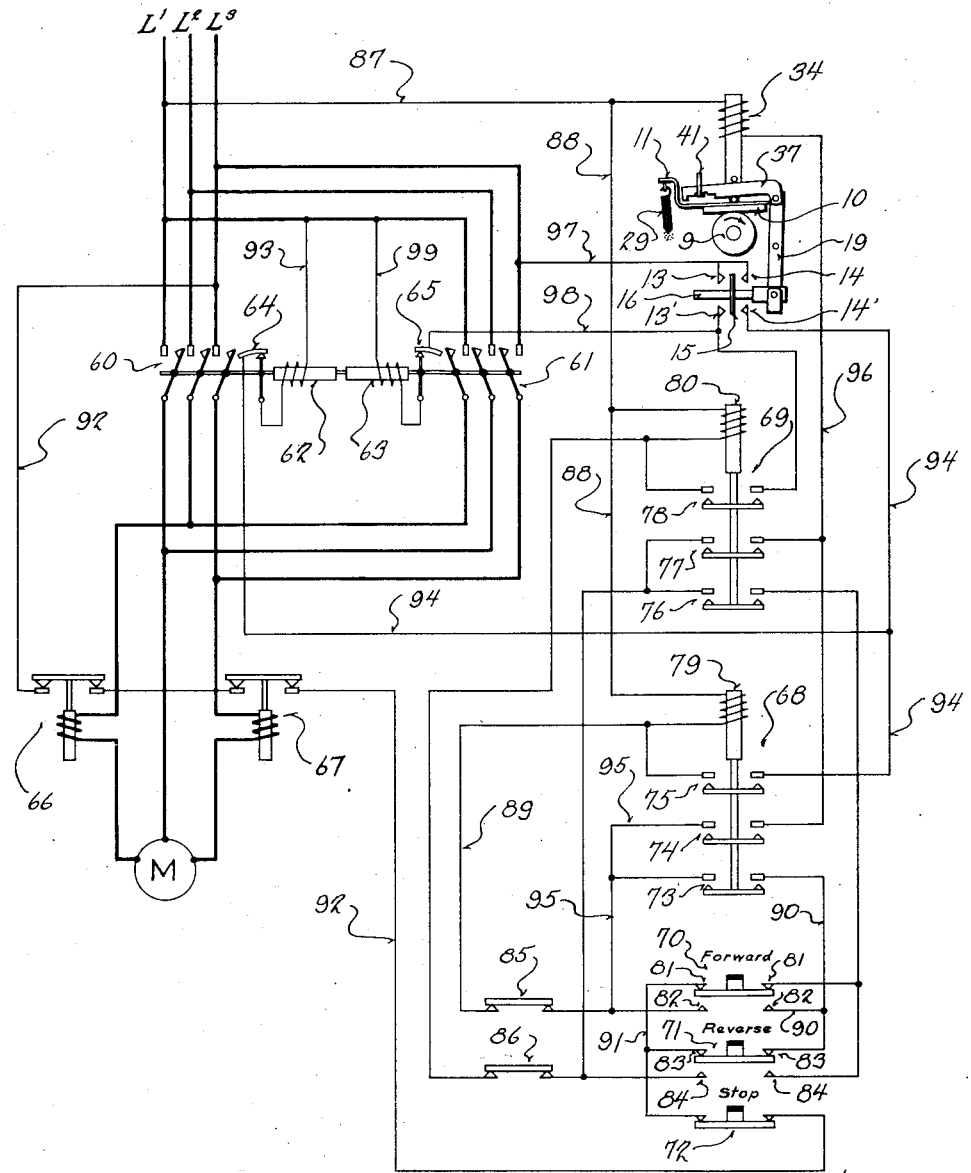

Patented June 14, 1938

2,120,690

UNITED STATES PATENT OFFICE 2,120,690

ELECTRIC CONTROL SYSTEM

Gustav O. Wilms, Milwaukee, and Lynn H. Matthias, Shorewood, Wis., assignors to Allen-Bradley Company, Milwaukee, Wis., a corporation of Wisconsin Application April 3, 1935, Serial No. 14,436

11 Claims. (Cl. 172—179)

This invention relates to improvements in electric control systems and refers more particularly to dynamic braking or plugging systems for controlling electric motors.

Expedients heretofore proposed for this purpose invariably were so designed and constructed as to necessitate constant frictional engagement between a part driven by the revolving motor shaft and some movable or shiftable element operable upon change in the direction of rotation of the shaft.

Obviously, it is undesirable in any mechanism to have a constant frictional engagement between relatively movable parts, and it is therefore an object of this invention to provide a control system by which frictional engagement between the revolving part and the part actuated thereby, obtains only for the short period of time during which the actual plugging or dynamic braking of the motor takes place.

In this connection it is a more specific object of this invention to provide cooperating frictionally engageable elements one of which revolves with the motor shaft and the other of which actuates the plugging switch, said elements being normally held disengaged by an electromagnet, deenergization of which to allow engagement of the elements, occurs when the "stop" switch for initiating the plugging of the motor is actuated.

Another serious disadvantage of many of the past and existing plugging switches is that they did not positively prevent reclosing of the motor circuit after the motor came to rest. To correct this disadvantage, the present invention contemplates a novel latch arrangement whereby the movable contactor of the switch controlling the plugging of the motor is positively and securely locked or held against actuation in either direction the instant the motor starts its reverse rotation so that subsequent operation of the motor in either direction is impossible except through the medium of the regular starting switches.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 3 is a diagrammatic illustration of the entire system as applied to an induction motor.

Figures 1, 2:
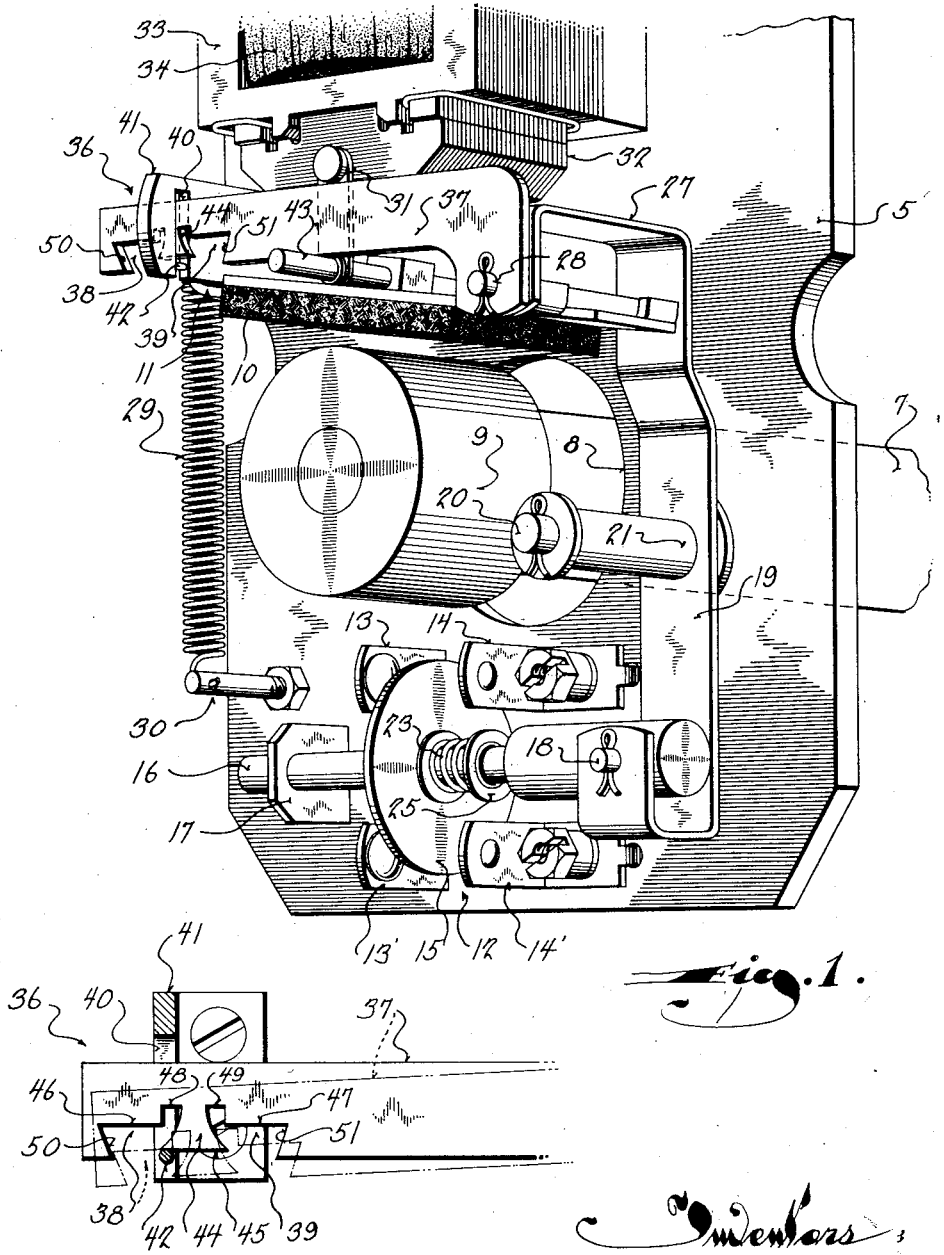
Figure 1 is a perspective view of the main mechanical elements of the system.
Figure 2 is an enlarged detail view partly in section and partly in elevation illustrating the latch mechanism.

Referring now more particularly to the accompanying drawings in which like numerals indicate like parts throughout the several views, the numeral 5 designates the base or panel upon which the plugging switch per se and its actuating mechanism are mounted. This base or panel is adapted to be secured to the back wall of a box-like housing (not shown) so that in service the entire mechanism is completely closed.

The back wall of the housing has a bearing (not shown) in which a shaft 7 revolves. The shaft 7 is connectible in any suitable manner to the rotor shaft of the motor to be controlled, or it may be an extension of the rotor shaft. The inner end of the shaft projects through a hole 8 in the base or panel and has a driving wheel or collar 9 fixed thereon so as to revolve with the shaft.

Above the wheel or collar 9 is a friction shoe 10 carried by a lever 11 and adapted under certain circumstances to be hereinafter brought out, to engage down on top of the driving wheel or collar 9 so that through the frictional engagement therebetween the lever 11 is moved endwise with respect to the lever in one direction or the other depending upon the direction of rotation of the wheel or collar.

Beneath the wheel or collar 9 is a switch, indicated generally by the numeral 12, which is normally open, as shown in Figure 1, but which is closed upon actuation of the lever 11 in either direction as a consequence of engagement between the friction shoe 10 and the wheel or collar 9.

The switch 12 comprises two sets of stationary contacts 13 and 13' and 14 and 14' mounted on the base or panel 5 and a movable contactor 15 adapted to electrically bridge either set of stationary contacts. The movable contactor 15 is in the form of a metal disk or washer mounted on a rod 16 of insulating material having one end slidably received in a bearing 17 carried by the base or panel 5 and its other end pivotally connected to, as at 18, and supported by a medially pivoted lever 19. The lever 19 is pivotally mounted substantially at its center by a post 20 fixed to the base or panel 5, a bearing bushing 21 being secured to the lever to provide increased bearing surface.

The contactor disk 15 is loose on the rod 16 and is yieldingly held in a normal position at which, when the parts are in their inactive positions shown in Figure 1, the contactor is located centrally between the two sets of stationary contacts, by coil springs 23 (only one being shown) mounted on the rod at opposite sides of the contactor disk and confined between the contactor disk and collar 25 (only one being shown) secured to the rod 16.

This manner of mounting the contactor disk allows for overtravel on the part of the rod 16 in engaging the contactor with either set of stationary contacts and provides contact pressure as well.

The upper end of the lever 19 is bent outwardly and downwardly to form a yoke 27 between the depending arms of which the adjacent end of the lever 11 is pivotally mounted by a pin 28. The pin 28 thus provides a fulcrum for the lever 11 about which it swings toward and from the driving wheel or collar 9, and to yieldingly urge the lever 11 toward the driving wheel or collar 9, a contractile spring 29 is connected to the free end thereof, the spring being anchored as at 30 to the base or panel 5.

Engagement between the friction shoe 10 and the wheel 9 is thus maintained by the spring 29 unless the lever 11 is held in a lifted position as shown in Figure 1. To so hold the lever 11, it is connected through a freely swinging link 31 with the lower end of a vertically movable armature 32 of an electromagnet assembly 33. The magnet assembly 33 is carried by the base or panel 5 and while it may be of any desired construction or design, preferably is of that type shown and described in Patent No. 1,981,534, issued to Gustav O. Wilms and Albert J. Dawe, November 20th, 1934.

As described in detail in the aforesaid patent, and as will be apparent from the drawings the armature 32 is arranged to move axially into the coil 34 of the electromagnet upon energization thereof. As long as the electromagnet is energized, the lever 11 is held in its raised position with its friction shoe 10 disengaged from the wheel or collar 9, but immediately upon deenergization thereof, the spring 29 pulls the lever down to engage the friction shoe with the wheel, and if the wheel is at that time revolving, the lever 11 will be caused to move endwise and tangentially with respect to the wheel, in one direction or the other depending upon the direction of rotation of the wheel.

This movement of the lever 11 is transmitted through the lever 19 to the rod 16 which carries the contactor disk 15 into bridging relationship with respect to either set of contacts depending upon the direction of motion.

The closure of the electrical circuit in which the contacts 13 and 13' are connected, as will be hereinafter more fully described, effects the plugging or dynamic braking of the motor. This, as is well known to those skilled in the art, means that the motor switches are actuated to reverse the current phases so that through the tendency for the motor to turn in the opposite direction, the desired quick braking is accomplished.

As long as the motor continues to turn in the direction it revolves at the initiation of the braking effort, the mechanism holds the contactor 15 in its position electrically bridging the contacts 13 and 13', but the instant the motor stops and begins its reverse rotation, the mechanism is actuated to disengage the bridging contactor disk from the contacts 13 and 13'. This actuation of the lever mechanism obviously is the result of the frictional engagement between the brake shoe 10 and the wheel or collar 9 maintained by the spring 29.

It is of utmost importance in plugging switches that after the motor circuit is opened as by the disengagement of the contactor disk from the contacts 13 and 13' or from the contacts 14 and 14' if the rotation was in the opposite direction, reclosing of the motor circuit to cause the motor to operate in either direction must be precluded. If there is any possibility at all of having the motor circuit closed after the motor has come to rest, the switch is not only unreliable but highly dangerous.

In the present invention reclosing of the motor circuit after the motor has been brought to a stop by plugging the same in the manner hereinbefore described is an impossibility except through actuation of the regular forward or reverse push button switches with which the motor starting circuit is equipped. Accidental reclosing of the motor circuit, however, is positively precluded by a latch mechanism indicated generally by the numeral 36.

This latch mechanism comprises a latch finger 37 pivotally mounted at one end on the pin 28 which provides the pivotal connection between the levers 11 and 19. The opposite end of the latch finger 37 has two keeper recesses 38 and 39 cut into the lower edge thereof. This recessed free end portion of the latch finger is loosely received in a slot 40 extending up into an outwardly projecting flange 41 of a bracket secured to the base or panel 5. Extending across the bottom of the slot 40 is a pin 42 upon which the free end of the latch finger may rest to hook either of its recesses thereon upon endwise movement of the finger in one direction or the other from a central neutral position.

The armature of the electromagnet, however, is capable of lifting not only the lever 11 but also the latch finger 37 to hold the same off of the pin 42, and to this end, the attachment of the link 31 to the lever 11 includes a pin 43 which projects under the latch finger 37, as clearly shown in Figure 1, so that whenever the armature of the electromagnet is drawn up by energization of the electromagnet to lift the friction shoe off of the driving wheel or collar 9, it also holds the latch finger 37 off of the cross pin 42.

The keeper recesses 38 and 39 are identical in formation, but are oppositely arranged. The inner end walls of the recesses are formed by the sides of a substantially triangular central portion 44, which sides are preferably curved, as shown. With the leverage system in a neutral position, as shown in Figure 1, which is the position the parts occupy during the running of the motor in either direction, the central portion 44 is disposed above the pin 42 with its bottom edge 45 raised therefrom. Upon deenergization of the electromagnet and consequently dropping of the latch finger 37, the bottom edge 45 of the central portion 44 drops down onto the cross pin 42.

As particularly shown in Figure 2, the curved sides of the substantially triangular central portion 44 extend inwardly of the bottom edges 46 and 47 of the recesses 38 and 39 to define the inner side walls of notches 48 and 49, respectively, which extend up from the bottom edges 46 and 47 of the recesses 38 and 39, respectively, and are of a size to snugly engage the cross pin 42 and hold the latch finger 37 against movement in either direction.

Such hooking of the notches onto the cross pin 42, however, requires a back and forth motion on the part of the latch finger 37, by reason of the fact that the lower corners of the curved side walls of the central portion 44 extend laterally beyond or overhang the outer edges of the notches 48 and 49. In view of this overhang, the latch finger 37 when its central portion 44 rides off of the pin 42, is in such position with respect to the pin 42 that the notches are out of line with the pin 42 making engagement with the pin 42 impossible except by a change in the direction of endwise motion of the latch finger 37 which does not occur until the direction of rotation of the motor driven shaft begins to reverse.

Hence, upon the initial functioning of the mechanism to plug the motor by bridging either set of stationary contacts 13 and 13' or 14 and 14', the latch does not and cannot act except to limit the movement of the leverage mechanism by engagement of the end walls 50 or 51 of the recesses 38 and 39, respectively, with the pin 42. It will be observed that these end walls 50 and 51 are undercut so as to preclude accidental disengagement of the latch finger from the pin 42 in this position of the parts. The limits of motion which the outer ends of the recesses 38 and 39 through engagement with the pin 42 to permit the leverage system, are sufficient to insure firm engagement between the bridging contactor 15 and either set of its cooperating stationary contacts.

When the motor stops and reverse rotation begins, the motor circuit, as hereinbefore noted, is opened by the opposite actuation of the leverage system effected through the frictional engagement of the friction shoe and driving wheel, and inasmuch as the latch finger 37 is connected with the leverage system, it also is actuated upon such initial reverse actuation of the linkage.

This reverse movement of the latch finger hooks either notch 48 or 49, depending upon the direction of motion, onto the pin 42 and thus positively latches or holds the entire leverage system against actuation in either direction. The mechanism remains in this locked or latched condition until the magnet 33 is energized which requires actuation of the regular starting switch.

Upon energization of the electromagnet 33 its armature draws the lever 11 and the latch finger 37 up to their positions shown in Figure 1. The electromagnet is of course of sufficient strength to overcome the spring 29 and also to disengage the latch finger from the pin 42.

The distribution of forces acting on the leverage system during the lifting of the latch finger and lever 11 by the electromagnet, is in such balance that when the latch finger is disengaged from the pin 42, the leverage system seeks a neutral position at which the central portion 44 of the latch finger is directly above the pin 42. In other words, as soon as the latch finger is disengaged from the pin 42 and the friction shoe is lifted off the wheel, the forces acting laterally on the leverage system are zero.

From the description thus far, it will be readily apparent to those skilled in the art that this invention provides a plugging switch wherein frictional engagement obtains only for a short period of time and is not maintained constantly, and also that after the mechanism has operated to open the motor circuit and the motor has been stopped, accidental reclosing of the motor circuit as a result of vibration of the machinery, or manually moving the motor armature or driven machinery, or from any other cause, is entirely precluded and that reclosing of the motor circuit requires manual actuation of the starting switch provided for this purpose.

Obviously one set of the stationary contacts bridged by the contactor disk 15 may be omitted and the switch used for plugging unidirectional motors, but the design of the switch is such that merely through the addition of this second set of stationary contacts, it is adapted for plugging in either direction, and in Figure 3 a reversing control system embodying the switch of this invention as arranged for plugging in both directions is diagrammatically illustrated.

In this diagrammatic illustration of Figure 3, it will be seen that the motor M is connectible with the lines $L^1$, $L^2$ and $L^3$ by closure of either of two switches designated by the numerals 60 or 61. When the switch 60 is closed, the current phases are such that the motor runs in a forward direction. The switch 60 thus may be termed the "forward" motor switch. Closure of the switch 61 reverses the current phases to cause the motor to run in an opposite direction so that the switch 61 may be referred to as the "reverse" motor switch.

These switches are mechanically interlocked so that when one is closed the other must be open, and both switches are actuated electromagnetically for which purpose electromagnets 62 and 63, respectively, are provided. The armatures of the electromagnets are suitably connected with the movable contactors of the switches, and to illustrate the mechanical interlock between the switches, the armatures are, in the diagram, shown connected together.

Associated with the switches 60 and 61 are auxiliary control switches 64 and 65, respectively. These auxiliary switches are so constructed that both are closed when the main motor switches 60 and 61 are open and each remains closed while its motor switch is closed, but being mechanically interlocked like the main motor switches 60 and 61 when the forward motor switch 60 closes, the auxiliary switch 65 of the reverse motor switch opens, and vice versa.

Also associated with the lines to the motor are the conventional overload relays 66 and 67 which open to interrupt the motor circuit in the event of overload, as is customary.

The plugging switch of this invention is electrically connected with the main motor switches and more particularly their operating magnets, as will be hereinafter more fully described, and also with associated forward and reverse relays 68 and 69, respectively.

Push button switches 70 and 71 to set the control circuits so as to effect forward or reverse operation of the motor are also provided, and a stop push button switch 72 provides the manually controlled means for initiating plugging of the motor to effect the desired braking.

The forward and reverse relays 68 and 69, respectively, each have three normally open switches 73, 74 and 75, and 76, 77 and 78, respectively, all of which are simultaneously closed upon energization of the electromagnets 79 and 80 of the relays 68 and 69, respectively.

The forward and reverse push button switches are of the type which complete a circuit in each of their two positions. In its normal position, the forward push button switch 70 bridges contacts 81—81, and in its depressed position, it bridges contacts 82—82.

The reverse push button switch in its normal position bridges stationary contacts 83—83, and in its depressed position bridges stationary contacts 84—84.

The stop push button switch is normally closed and when depressed opens the circuit with which it is connected.

If the installation is such that limit switches are necessary, they may be provided and in the diagrammatic illustration, these are indicated by the numerals 85 and 86.

With the motor at rest, the various switches of the system are in their positions shown in the diagrammatic illustration of Figure 3. Assuming now that it is desired to start the motor for operation in a forward direction, the "forward" push button 70 is depressed opening the electrical connection between the contacts 81—81 and bridging the contacts 82—82. This action establishes an energizing circuit for the magnet 79 of relay 68 as follows:

One side of the magnet 79 is connected with line L¹ through conductors 87 and 88. The other side of the electromagnet is connected with the stationary contact 82 of the forward push button switch through conductor 89 in which the limit switch 85 is interposed.

The other contact 82 of the forward push button switch is connected with contact 83 of the reverse push button switch and also with one side of switch 73 by conductors 90. The other contact 83 of the reverse push button switch is connected with one side of the stop push button switch 72 and with one of the contacts 81 of the forward push button switch through conductors 91.

The other side of the stop push button switch is connected through conductor 92 in which the switches of the overload relays 66 and 67 are interposed, with the line L³.

Upon energization of the magnet 79, the switches 73, 74 and 75 are closed. Closure of these switches effects energization of electromagnet 62 of the forward motor switch 60 to close the same, and also closes the circuit of the electromagnet coil 34 of the plugging switch, besides providing a hold-in switch to maintain the circuit of the solenoid 79 after the forward push button switch is released and returned to its normal position bridging the contacts 81—81.

The energization of the magnet 62 to close the forward motor switch is controlled by the switch 75.

The circuit completed upon closure of the switch 75 to effect the energization of the magnet 72 is as follows: From line L¹ a conductor 93 leads to one side of the solenoid of magnet 62, the other side thereof is connected with the movable contactor of auxiliary switch 64. From the stationary contact of the switch 64, a conductor 94 leads to one side of the switch 75 and also to contact 14' of the plugging switch. The other side of the switch 75 is connected with the conductor 89 so that the circuit now being traced is completed through conductor 89, a conductor 95 connected therewith and leading to one side of each of the switches 73 and 74, through the switch 73 to conductor 90, through the reverse push button switch and conductor 91 to the stop push button switch, and from there through conductor 92 to line L³.

The electromagnet coil 34 is energized in response to the closure of the switch 74. Its circuit is as follows: From line L¹ through conductor 87 to one side of the coil 34; from the other side thereof through conductor 96 to one side of switch 74; from the other side of the switch 74 through conductor 95 to one side of the switch 73, and from the other side of the switch 73 out to the line L³, as previously described.

The switch 73, as will be readily apparent, is in parallel with the contacts 82—82 of the forward push button switch so that when closed it maintains the circuit of the magnet coil 79 after release of the forward push button switch.

The motor is now connected with the lines L¹, L² and L³, so as to effect forward rotation, and the plugging switch, by reason of the energization of the magnet coil 34, is in its neutral position, shown in Figure 1 with the contact disk disposed centrally between the sets of contacts 13 and 13' and 14 and 14', and with the friction shoe raised off of the driving wheel or collar 9.

With the motor operating in a forward direction, the driving wheel or collar 9 turns in a clockwise direction, as viewed in the several figures of the drawings and also in the diagram of Figure 3, so that when the plugging action takes place and the friction shoe drops down onto the wheel or collar 9, the contacts 13 and 13' will be bridged by the contactor 15.

To effect the plugging action, it is only necessary to depress the stop push button switch 72. Actuation of the stop push button switch 72 opens the circuit of the electromagnet 79, as will be readily apparent, so that upon such actuation of the stop push button switch 72 all of the switches 73, 74 and 75 of the relay 68 open. The opening of these switches, as will be apparent from the fact that they control the energization of the electromagnets 62 and 34, causes deenergization of these electromagnets and with the resulting deenergization of the electromagnet 34, the plugging switch mechanism operates, as hereinbefore described, to bridge the contacts 13 and 13'.

Bridging the contacts 13 and 13' effects energization of the electromagnet 63 of the reverse motor switch 61 as the contact 13 is connected with the line L³ by conductor 97 and the contact 13' is connected by conductor 98 with the stationary contact of auxiliary switch 65. This switch being closed and its movable contactor being connected with one side of the electromagnet 63, the circuit is continued therethrough to be completed through conductor 99 back to line L¹.

Energization of the electromagnet 63 closes the reverse motor switch 61 and thus effects the desired electric braking of the motor.

As soon as the motor comes to rest and immediately upon the slightest indication of rotation in the reverse direction, the circuit of the electromagnet 63 is opened by disengagement of the contactor 15 from the contacts 13 and 13' whereupon the entire system is rendered inactive.

The manner in which subsequent actuation of either the forward push button switch or the reverse push button switch effects corresponding operation of the motor will be readily apparent from the diagram without further description.

It is to be noted, however, that the system provides electric braking for the motor in both directions and that the assurance against possible restarting of the motor after it has been stopped by the electric braking action makes this dual functioning on the part of the braking switch feasible, for without the provision of the latch mechanism by which the contactor 15 is positively latched against movement in either direction upon opening of the motor circuit, the danger of accidental operation of the motor in the opposite direction would be so great as to preclude any attempt to use the switch for plugging in both directions.

What we claim as our invention is:

1. In combination, a reversible electric motor, switch means operable to change the direction of rotation of the motor, cooperating frictionally engageable means for actuating the switch means to and from circuit making position depending upon the direction of the rotation of the motor, one of said cooperating means being driven by the motor, latch means to secure the switch means in a circuit breaking position, and means for holding the frictionally engageable means entirely separated as long as the motor is energized to run in one direction.

2. In combination, a reversible electric motor, a switch adapted when closed to connect the motor with its source of supply in such a manner that a torque is imposed on the motor in a direction opposite to the direction of rotation of the motor thus tending to cause the motor to run in a reverse direction, friction means for actuating the switch, said friction means being driven by the motor and arranged to close said switch when said friction means is rendered operable while the motor is in operation and to open the switch the instant the motor begins its reverse rotation, latch means automatically operable to secure the switch in open position upon such opening of the switch so as to preclude accidental closure of said switch to effect subsequent operation of the motor, and means for maintaining the friction means inoperative as long as the motor is energized to run in one direction.

3. In a control system for electric motors, switch means to establish running and plugging circuit connections between the motor and a line and to effect complete opening of the motor circuit, and means inactive as long as the motor is energized to run in one direction but operative upon plugging the motor for actuating certain of said switch means to open the motor circuit the instant the motor starts to turn in the reverse direction.

4. In a control system for electric motors, switch means to establish running and plugging circuit connections between the motor and a line and to effect complete opening of the motor circuit, a wheel rotating at all times with the motor, a friction member engageable with the wheel to be moved thereby first in one direction and then in the other direction as the motor is plugged and operable upon its second motion to effect actuation of certain of said switch means to open the motor circuit the instant the motor starts to turn in the reverse direction, electroresponsive means for controlling engagement between the friction member and wheel, and circuit means connecting the electroresponsive means with the switch means so that until the motor is plugged the friction means is held entirely disconnected from the rotating wheel to be engaged therewith concomitantly with the plugging of the motor.

5. In a control system for electric motors, switch means to establish running and plugging circuit connections between the motor and a line and to effect complete opening of the motor circuit, means inactive as long as the motor is energized to run in one direction but operative upon plugging the motor for actuating certain of said switch means to open the motor circuit the instant the motor starts to turn in the reverse direction, and means to positively maintain the motor circuit open until a subsequent actuation of other of said switch means to again run the motor.

6. In a control system for electric motors, switch means to establish running and plugging circuit connections between the motor and a line and to effect complete opening of the motor circuit, means inactive as long as the motor is energized to run in one direction but operative upon plugging the motor for actuating certain of said switch means to open the motor circuit the instant the motor starts to turn in the reverse direction, and means to maintain said designated switch means in its circuit opening position until a subsequent actuation of other of said switch means to again run the motor.

7. In a control system for electric motors, switch means to establish running and plugging circuit connections between the motor and a line and to effect complete opening of the motor circuit, a wheel rotating at all times with the motor, a friction member engageable with the wheel to be moved thereby first in one direction and then in the other direction as the motor is plugged and operable upon its second motion to effect actuation of certain of said switch means to open the motor circuit the instant the motor starts to turn in the reverse direction, electroresponsive means for controlling engagement between the friction member and wheel, circuit means connecting the electroresponsive means with the switch means so that until the motor is plugged the friction means is held entirely disconnected from the rotating wheel to be engaged therewith concomitantly with the plugging of the motor, and releasable means to maintain said certain switch means in its position preventing closure of the motor circuit until a subsequent actuation of other of said switch means to again run the motor.

8. In a control system for electric motors, switch means to establish running and plugging circuit connections between the motor and a line and to effect complete opening of the motor circuit, a wheel rotating at all times with the motor, a friction member engageable with the wheel to be moved thereby first in one direction and then in the other direction as the motor is plugged and operable upon its second motion to effect actuation of certain of switch means to open the motor circuit the instant the motor starts to turn in the reverse direction, electro-responsive means for controlling engagement between the friction member and wheel, circuit means connecting the electro-responsive means with the switch means so that until the motor is plugged the friction means is held entirely disconnected from the rotating wheel to be engaged therewith concomitantly with the plugging of the motor, and releasable latch means for securing the friction member in the position to which it is moved by its second motion until a subsequent actuation of other of said switch means to again run the motor.

9. In a motor control system, means operable to effect plugging of a running motor and to completely disconnect the motor from its line the instant the motor starts to turn in a reverse direction, said means including frictionally engageable elements through which rotation of the motor is translated into switch actuating motion, and means for keeping said elements wholly disconnected and uninfluenced by each other until operation of the means for effecting plugging.

10. In a control system for electric motors, a running switch for connecting the motor with a line, a plugging switch, means adapted to be mechanically driven by the motor to successively close the plugging switch and then open the same the instant the motor begins to turn in a reverse direction, said means being mechanically disconnected from the motor as long as the running switch is closed, and means to simultaneously effect opening of the running switch and to effect mechanical connection between the motor and said driven means.

11. In a control system for electric motors, a running switch for connecting the motor with a line, a plugging switch, means driven from the motor to successively close the plugging switch and then open the same the instant the motor begins to turn in a reverse direction, said means including frictionally engageable elements, means for maintaining said frictionally engageable elements entirely separated as long as the running switch is closed, and means to simultaneously effect opening of the running switch and engagement of said elements to render the motor driven means operative.

GUSTAV O. WILMS.
LYNN H. MATTHIAS.